US006604353B1

(12) United States Patent
Johnson

(10) Patent No.: US 6,604,353 B1
(45) Date of Patent: Aug. 12, 2003

(54) ELEVATED TRAILER DRAWBAR FOR AN AGRICULTURAL COMBINE

(75) Inventor: Orlin W. Johnson, Geneseo, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/637,472

(22) Filed: Aug. 11, 2000

(51) Int. Cl.[7] .............................................. A01B 73/00
(52) U.S. Cl. ................................. 56/228; 56/DIG. 14
(58) Field of Search ....................... 56/1, 228, DIG. 14; 414/501; 208/507

(56) References Cited

U.S. PATENT DOCUMENTS

| 3,245,695 A | * | 4/1966 | Bernard .................. 280/411.1 |
| 3,545,548 A | | 12/1970 | Hadfield |
| 3,752,092 A | * | 8/1973 | Vinyard ........................ 111/7 |
| 4,157,200 A | * | 6/1979 | Johnson ..................... 114/344 |
| 4,428,182 A | * | 1/1984 | Allen et al. ................... 56/14.6 |
| 4,637,625 A | * | 1/1987 | Blackwell .................... 280/411 |
| 5,021,030 A | | 6/1991 | Halford et al. |
| 5,181,734 A | * | 1/1993 | Brown .................... 280/414.1 |
| 5,207,277 A | | 5/1993 | Medlock |
| 5,210,999 A | * | 5/1993 | Cosimati ................... 56/327.1 |
| 5,480,174 A | * | 1/1996 | Grenier .................... 280/414.1 |
| 5,522,670 A | | 6/1996 | Gilmore et al. |
| 5,564,721 A | * | 10/1996 | Wians .................... 56/DIG. 14 |
| 5,904,365 A | * | 5/1999 | Dillon ........................ 280/419 |
| 5,941,768 A | * | 8/1999 | Flamme ..................... 460/114 |
| 6,012,272 A | * | 1/2000 | Dillon ........................ 56/14.6 |
| 6,073,953 A | * | 6/2000 | Kendall ..................... 280/447 |

FOREIGN PATENT DOCUMENTS

| DE | 2353172 | * | 5/1975 |
| DE | 19950808 A1 | * | 4/2001 |
| GB | 1 4431 254 | | 4/1976 |

OTHER PUBLICATIONS

Marley, Farm Show Magazine, "Tag–Along Grain Cart Dumps Out the Side", vol. 19, , No. 1, p. 4.*

* cited by examiner

*Primary Examiner*—Robert E. Pezzuto
*Assistant Examiner*—Nathan Mammen
(74) *Attorney, Agent, or Firm*—Rebecca Henkel

(57) ABSTRACT

An elevated drawbar for a grain cart that can be attached to the rear end of an agricultural combine above the crop residue discharge opening. The elevated position of the grain cart drawbar allows the crop residue to be discharged under the drawbar. The crop residue can therefore travel unobstructed from the combine's discharge opening to the ground.

3 Claims, 3 Drawing Sheets

ELEVATED TRAILER DRAWBAR FOR AN AGRICULTURAL COMBINE

FIELD OF THE INVENTION

The present invention relates generally to agricultural combines. It relates particularly to a trailer towing system for agricultural combines.

BACKGROUND OF THE INVENTION

An agricultural combine is a common and well-known machine for harvesting crop materials. Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the crop field and feeds the crop materials to a separating or threshing system. Several different types of threshing systems are available, such as rotary threshers and straw walkers. Regardless of the type of threshing system used, the thresher separates the course non-grain materials from the grain heads. The course non-grain material primarily consists of grain stalks and exits the threshing system along its rear end. The grain heads, on the other hand, exit the thresher along the bottom of the threshing assembly and pass to a series of moving sieves. The sieves separate the grain from the unwanted fine materials, sometimes referred to as chaff. After separation, the grain is directed to a grain bin through an augering system, and the unwanted fine materials exit the sieves along the rear end.

The agricultural economy continues to pressure farmers to be more efficient in their farming practices. One area that is of particular concern to farmers is the harvesting operations because of the dramatic impact that the harvest can have on a farm's success. Typically, farmers prefer that harvesting operations proceed as quickly as possible. One reason that a quick harvest is desirable is the unpredictability of the weather and the risk of losing a portion of the crop due to rains, snow, wind, or hail. Another reason for this urgency is the high cost of the harvesting operation, which includes the cost of combines, trucks, and labor. By operating quickly and efficiently, a farmer can lower the cost of the harvesting operation by harvesting a larger area of land with the same equipment and manpower.

A development in harvesting practices that has increased overall efficiency is the use of grain carts. Grain carts are trailers that have large grain bins for storing the harvested grain. In the past, combines were commonly forced to cease harvesting when the onboard storage bin of a combine became filled with grain but a truck was unavailable for unloading the grain. Unavailability of a truck at the proper time is a common problem when travel distances are long, an insufficient number of trucks are supplied or the crew is short of drivers. This situation frequently results in the combine sitting idle while it waits for a truck to arrive. The idle time that results is costly because less acreage is harvested during a given period of time.

Grain carts have improved this problem by providing an interim storage location in which the combine can unload its own onboard grain bin when it becomes full. The grain cart can then independently fill the trucks when they are available. Typically, grain carts are unpropelled trailers that are towed by agricultural tractors. Agricultural tractors are most often chosen by farmers for pulling the grain carts because they are already designed for pulling heavy loads. Such tractors are usually available during harvest season because they are not needed for other farm operations.

The use of an agricultural tractor to tow the grain cart is not always the most efficient option however. A grain cart typically does not fully utilize the tractor's load pulling capacity because of the relatively light load of the grain cart. This can have a negative impact on the resale value of the tractor because the age of agricultural tractors is based solely on hours of usage. In addition, while many farmers may have an extra tractor available during harvest season, some farmers may not have tractors freely available.

The tractor problem also affects contract combine operators who harvest on a custom basis and travel from state to state during the nation's harvest season. These operators must purchase an additional tractor to tow the grain cart and must transport this extra piece of equipment from site to site. Another problem with using an agricultural tractor to tow a grain cart occurs when a contract operator runs a large fleet of combines. In this situation, it is desirable to use several grain carts. However, this requires additional tractors, which would raise costs even further.

A more efficient solution for towing a grain cart is to use the combine itself. This solution has several advantages. An extra towing vehicle, like the agricultural tractor, is unneeded. Manpower required is decreased because an additional driver for the towing vehicle is no longer needed. Furthermore, additional grain carts can be used to further increase efficiency. For example, when a separate towing vehicle is used, the number of grain carts used in an operation is usually reduced because of the extra cost of the towing vehicles. Thus, a single grain cart usually services several combines. However, when the grain cart is towed directly by the combine, each combine can be served by its own grain cart because the grain carts themselves are relatively inexpensive.

Using the combine as the towing vehicle has historically had some disadvantages however. In known combines, the drawbar of the grain cart is attached to the combine at a connection point near the rear axle. This connection point has traditionally been provided by manufacturers for towing a trailer that carries the combine's header in a lengthwise orientation from site to site. However, because this connection point is positioned below the crop residue discharge opening, additional problems are created when a grain cart is towed. Because the drawbar of the grain cart obstructs the path of the crop residue as it travels between the combine's discharge opening and the ground, the combine is unable to evenly spread the crop residue onto the crop field. Modern farming practices require an even spread of the crop residue across the entire field. This is especially true with the recent practice of no-till farming, but also remains important for more traditional farming techniques. However, when the path of the crop residue is obstructed by the grain cart's drawbar, the resulting blanket of residue on the field is uneven, with some areas having thicker sections of residue and other areas having thinner sections.

Another problem is that some of the crop residue builds up on the grain cart's drawbar. This buildup tends to compact itself on the drawbar into mounds of residue until they eventually break loose from the drawbar and fall to the ground. As a result, the farmer's field is left with a number of these compact mounds of residue scattered throughout the field. This result is unattractive and causes further difficulties for the farmer when trying to evenly till the ground.

Still another problem arises because weed seeds are carried from field to field. This problem has become one of increasing concern to farmers as noxious weeds continue to spread over larger regions of farm land. The difficulty and expense of controlling noxious weeds once they become established makes it important to prevent the introduction of these weeds into uninfected fields. Farmers have increasingly begun to recognize that the spread of these noxious weeds can be minimized by cleaning their agricultural equipment of stray crop residue before transporting from field to field. This practice prevents weed seeds from one field from being inadvertently transplanted into an uninfected field from an infected field. However, the cleaning process is laborious and often overlooked. Farmers would therefore prefer to minimize the number of places where crop residue can accumulate and be transported from one field to another.

This problem of crop residue buildup on the grain cart drawbar also has the potential for fostering equipment fires. Fires during the harvest season are not infrequent occurrences. Typically, the weather is especially dry during the harvest season with the crops being equally dry. With this combination of dry conditions and a flurry of harvesting activity occurring, it is not uncommon for farmers to loose equipment in a fire. Any excess buildup of crop residue on the equipment, therefore, is undesirable because this buildup could potentially serve as an original source of a fire or may sustain a fire that has already started.

Finally, the general appearance of the farmer's equipment is adversely affected when the combine discharges crop residue onto the grain cart drawbar. Farmers tend to take a great deal of pride in their equipment and prefer to keep it in good condition and looking new. However, when crop residue sprays onto the drawbar, the residue can become encrusted onto the surface of the drawbar so that it becomes difficult to fully clean off. In some cases, where the combine sprays the residue out at a high speed and the manufacturer of the grain cart uses a low quality paint, the paint on the drawbar can even be stripped away. Thus, farmers prefer equipment that is relatively self-cleaning.

BRIEF SUMMARY OF THE INVENTION

Accordingly, it is an object of the invention to provide an improved system for connecting a grain cart and a combine.

It is a further object of the invention to provide a combine and grain cart with a connecting system including an elevated drawbar so that the crop residue will be discharged below the drawbar.

According to the invention, a connecting system includes a drawbar which is connected to the combine above the combine's crop residue discharge opening. Several different connection mechanisms may be provided for attaching the grain cart drawbar to the rear end of the combine. These mechanisms may include a pin and clevis, ball joint, pintle hitch, or a rigid connection. A vertical section of the drawbar may also be used in combination with a shield to further direct the crop residue in a desired direction. The shield can be formed in different shapes so that the crop residue is directed in a variety of directions, including downwards or to the sides.

BRIEF DESCRIPTION OF SEVERAL VIEWS OF THE DRAWINGS

The invention, including its construction and method of operation, is illustrated more or less diagrammatically in the drawings, in which.

DETAILED DESCRIPTION OF THE INVENTION

Figure 1:
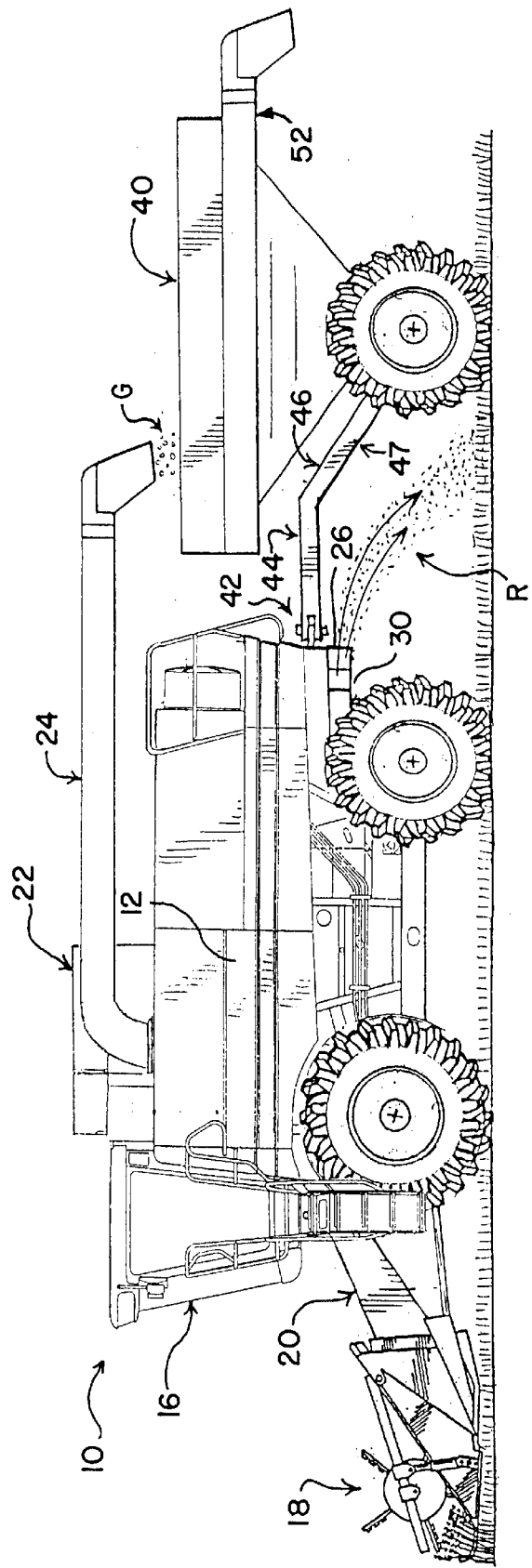
FIG. 1 is a side elevational view of a grain cart attached to the rear end of an agricultural combine with a connecting system embodying features of the invention, showing crop residue being discharged from the rear of the combine.
Figure 2:
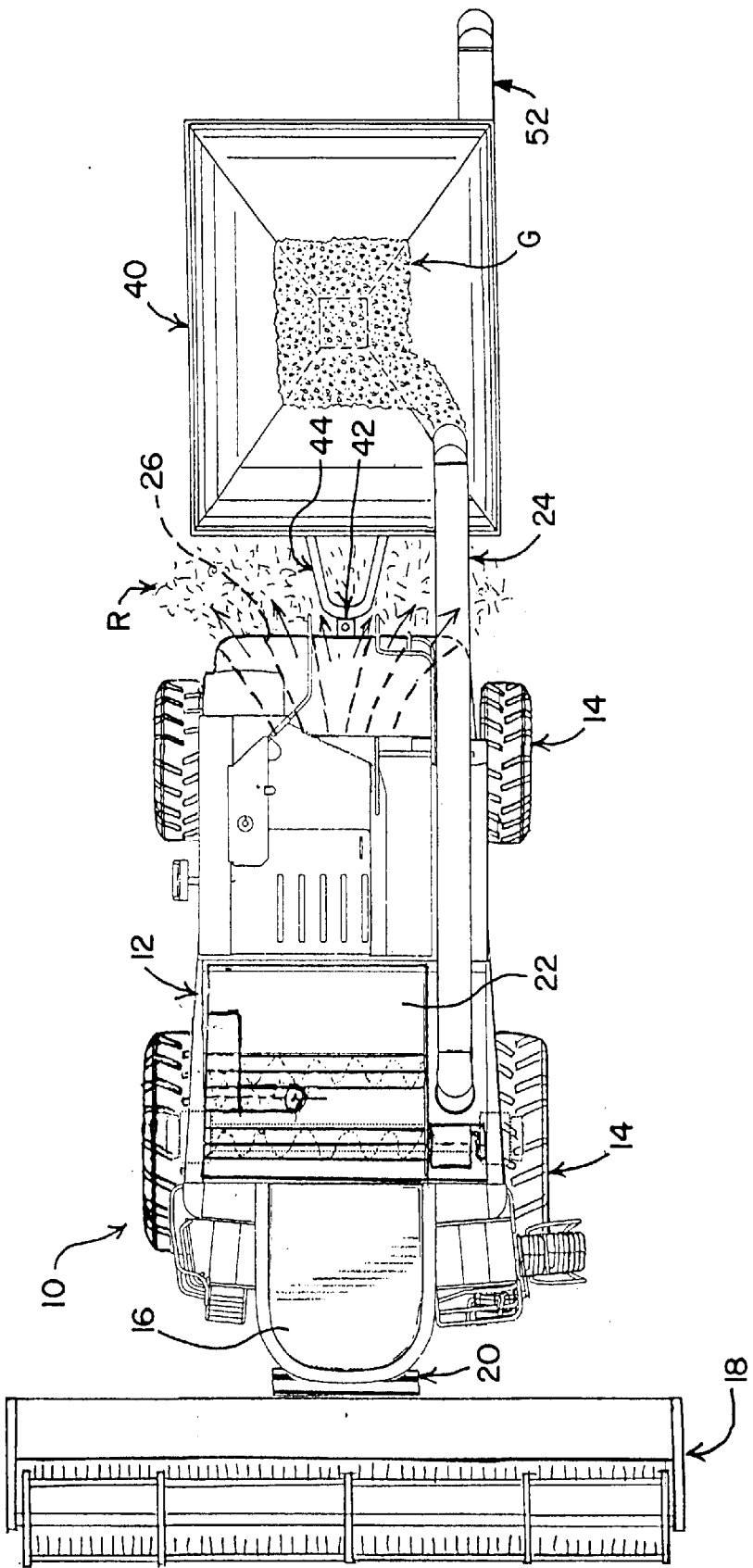
FIG. 2 is a top plan view of the grain cart and combine of FIG. 1, showing crop residue being discharged from the rear of the combine.
Figure 3:
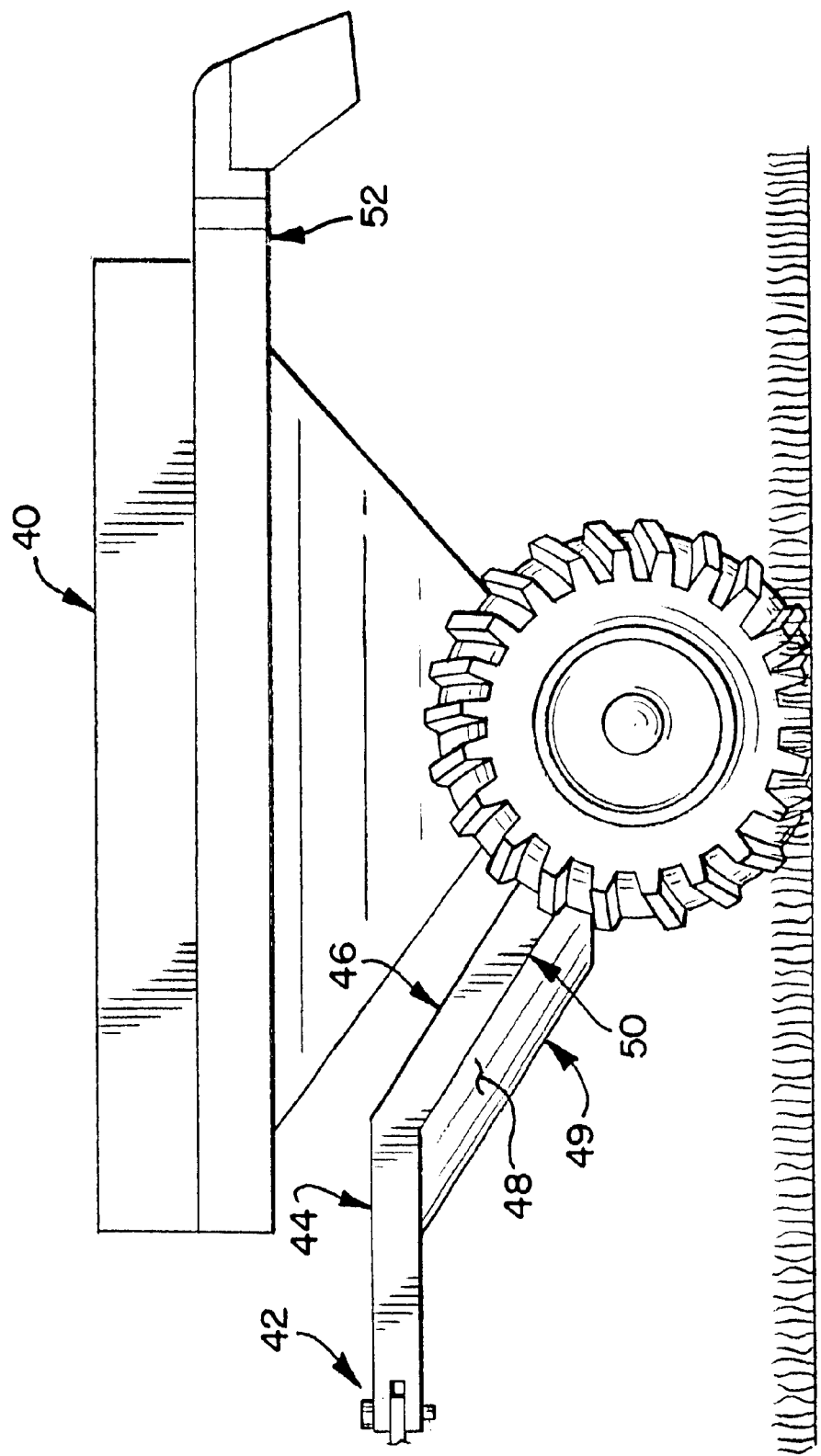
FIG. 3 is a side elevational view of a grain cart, showing a V shaped shield along the bottom side of the drawbar.

Referring now to the drawings, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10.

At the forward end of the combine 10 is a crop harvesting header 18 that severs and gathers the ripened crop materials from the crop field. After cutting the stems of the crop materials or collecting the crop materials from a prepared windrow, the crop materials are fed rearward through a feeder housing 20 to the combine's internal threshing systems (not shown). The threshing systems then separate the grain from the unwanted crop residue R. After the threshing systems have separated the grain G from the crop residue R, the grain G is transferred to an onboard storage bin 22 by an augering and paddle elevator system, and the unwanted crop residue R is discharged from the rear end of the combine 10 onto the harvested crop field.

In order to improve harvesting efficiency, manufacturers have regularly increased the capacity of the, combine's onboard storage bin 22. Typically, modern combines 10 have storage bins 22 with approximately 200 bushels of capacity. By increasing the size of the storage bin 22, farmers are able to improve their efficiency because the combine 10 can harvest for longer periods of time before stopping to unload the harvested grain G. When the onboard storage bin 22 fills up with grain G, the grain G may be emptied into a grain cart 40 through an unloading auger 24 while harvesting. By emptying the storage bin 22, the combine 10 is able to continue harvesting.

As previously mentioned, the combine 10 discharges the unwanted crop residue R from the rear end of the combine 10 back onto the harvested crop field. A number of systems are available for discharging the crop residue R. For example, some discharge systems use straw spreaders. This design usually employs two separate horizontal disks that rotate in a horizontal plane. Attached to the disks is a series of bats. The crop residue then is dropped onto the rotating disks and is thrown out in a wide pattern by the bats. In another example, a straw chopper is mounted transversely in the rear of the combine 10. The straw chopper employs a multitude of flail blades that are attached to a rotating hub. The crop residue R is then chopped up by the flail blades and is discharged at high speed. Directional vanes 26 are sometimes provided to redirect the exiting crop residue R into a wider distribution pattern. However, in some instances, a wide distribution pattern is not desired. Sometimes the farmer wishes to recover the crop residue R by bailing it for other uses. In order to satisfy this desire, the crop residue R is simply dropped onto the ground in a narrow windrow.

According to the present invention; combine 10 efficiency is maximized by attaching a grain cart 40 to the rear end of the combine 10. Typically, the grain cart 40 will have a storage capacity between 400 and 1,000 bushels, while the storage capacity of the combine's onboard storage bin 22 usually ranges from 200 to 300 bushels. By comparison, the receiving trucks that haul the grain G from the field generally range in size from about 600 to 1,000 bushels. Therefore, it is expected that farmers will choose a combination between the combine storage bin 22, the grain cart 40, and the truck so that the combined storage capacity of the combine 10 and the grain cart 40 matches the storage capacity of the truck. For example, if the capacity of combine storage bin 22 is 300 bushels and the capacity of the grain cart 40 is 700 bushels, a truck with a 1,000 bushels of capacity would be optimum. Thus, by towing a grain cart 40 directly behind the combine 10, harvesting efficiency is substantially improved because the combine can simply unload its onboard storage bin 22 into the attached grain cart 40 through the unloading auger 24 while the combine 10 is still harvesting. Once the combine 10 has filled both the storage bin 22 and the grain cart 40, the grain G will be unloaded into a receiving truck through the grain cart's unloading auger 52 and the combine's unloading auger 24. The speed of unloading the grain G can be further increased if a long truck, such as a semi-trailer truck, is used so that both the combine unloading auger 24 and the grain cart unloading auger 52 can simultaneously unload grain G into the truck.

In order to prevent interference with the discharging crop residue R, the grain cart 40 has an elevated drawbar 44. The drawbar 44 is attached to the rear end of the combine 10 at a raised position that is above the crop residue discharge opening 30. Thus with the present invention, the crop residue R is discharged underneath the drawbar 44. The crop residue R can then be freely spread into a wide distribution pattern or a narrow windrow without interference from the grain cart's drawbar 44. In contrast, prior art drawbars are attached to the combine 10 at a position below the crop residue discharge opening 30. The drawbar then interferes with the travel path of the discharged crop residue R and prevents the crop residue R from being distributed as desired.

A number of connection mechanisms 42 can be used with the invention to attach the grain cart 40 to the combine 10. One type of connection mechanism 42 that is commonly used with agricultural equipment is a pin and clevis. Another possible connection mechanism 42 is a ball joint. A pintle hitch would also suffice. These connection mechanisms 42 are preferred because they provide three degrees of freedom, which allows the grain cart 40 to freely rock back-and-forth and side-to-side as the grain cart passes over ridges in the ground. On the other hand, a less preferred connection mechanism 42 would be a two degree of freedom alternative that is rigidly attached to the combine 10. A grain cart 40 that uses this type of connection mechanism 42 would require pivoting dolly wheels in order to allow the grain cart 40 to turn corners with the combine 10.

The invention also allows a vertical section 46 of the drawbar 44 to be designed in a manner that will beneficially redirect the crop residue R. The vertical section 46 configurations that are possible are numerous. For example in FIG. 1, the vertical section 46 is shown sloping downward from the forward end to the rear end. By including a flat shield 47 along the bottom side of this sloping vertical section 46, the crop residue R is redirected downwards toward the ground when it contacts the shield. In another alternative shown in FIG. 8, a similar shield 48 shaped in the form of a V is included along the bottom side of the vertical section 46. The shield 48 is installed with the center 49 of the V facing forward and the edges 50 of the V trailing rearwards towards the sides of the drawbar 44. The crop residue R is thus redirected away from the centerline of the combine 10 when it contacts the V-shaped shield 48. Other shield configurations would also be possible to accommodate individual preferences.

While a preferred embodiment of the invention has been described, it should be understood that the invention so limited, and modifications may be made without departing from the invention. The scope of the invention is defined by the appended claims, and all devices that come within the meaning of the claims, either literally or by equivalence, are intended to be embraced therein.

I claim:

1. A connecting system for towing a trailer behind an agricultural combine, comprising:

a) a combine body;

b) a crop residue discharge opening located along a rear end of said combine;

c) a combine connection member located along a rear end of said combine and positioned above said crop residue discharge opening;

d) a trailer body;

e) a drawbar located along a front end of said trailer;

f) a trailer connection member located along a front end of said drawbar that can be operably attached to said combine connection member;

g) wherein said trailer is a grain cart; and h) wherein said drawbar includes a rear portion that is connected to said trailer at one end, said rear portion including a shield that directs crop residue onto the crop field.

2. The system according to claim 1, wherein:

a) said drawbar includes an elevated portion that is positioned more than about three feet above the ground; and b) said combine connection member is positioned more than about three feet above the ground.

3. The system according to claim 1, wherein:

a) said drawbar includes an elevated portion that is positioned more than about three feet above the ground; and b) said combine connection member is positioned more than about three feet above the ground; and c) wherein said rear portion of said drawbar is connected to said elevated portion on an end opposite said one end.

* * * * *